United States Patent
Misso et al.

[19]

[11] Patent Number: 6,125,017
[45] Date of Patent: Sep. 26, 2000

[54] ACTUATOR CRASH STOPS PROVIDING A TWO-STAGE BRAKING IMPULSE

[75] Inventors: Nigel F. Misso, Bethany; Steve S. Eckerd, Oklahoma City, both of Okla.

[73] Assignee: Seagate Technology, Inc., Scotts Valley, Calif.

[21] Appl. No.: 09/183,847

[22] Filed: Oct. 30, 1998

Related U.S. Application Data

[60] Provisional application No. 60/078,919, Mar. 20, 1998.

[51] Int. Cl.⁷ .................................................. G11B 5/55
[52] U.S. Cl. ............................................... 360/265.1
[58] Field of Search ................................... 360/105, 106, 360/265.1

[56] References Cited

U.S. PATENT DOCUMENTS

| | | |
|---|---|---|
| 4,635,151 | 1/1987 | Hazebrouck . |
| 4,890,176 | 12/1989 | Casey et al. . |
| 4,937,692 | 6/1990 | Okutsu . |
| 4,949,206 | 8/1990 | Phillips et al. . |
| 5,134,608 | 7/1992 | Strickler . |
| 5,600,516 | 2/1997 | Phillips et al. . |
| 5,973,888 | 10/1999 | Chawanya et al. ............... 360/105 |

*Primary Examiner*—Robert S. Tupper
*Attorney, Agent, or Firm*—Crowe & Dunlevy

[57] ABSTRACT

An improved crash stop apparatus having an inner crash stop that pressingly engages the actuator assembly of a disc drive when the read/write heads of the actuator assembly approach a desired inner extent of radial travel to prevent further movement of the read/write head beyond the inner extent of travel and furthermore having an outer crash stop that pressingly engages the actuator assembly when the read/write heads approach a desired outer extent of radial travel. The crash stops each have a pin rigidly mounted at a proximal end and having a cantilevered distal portion which is disposed in the path of travel of the actuator. An elastomeric member is disposed between the impacting actuator and the pin. The elastomeric member and cantilevered pin provide a two-stage braking impulse to decelerate the actuator, wherein the first stage compresses the elastomeric member and wherein the second stage deflects the cantilevered pin.

13 Claims, 8 Drawing Sheets

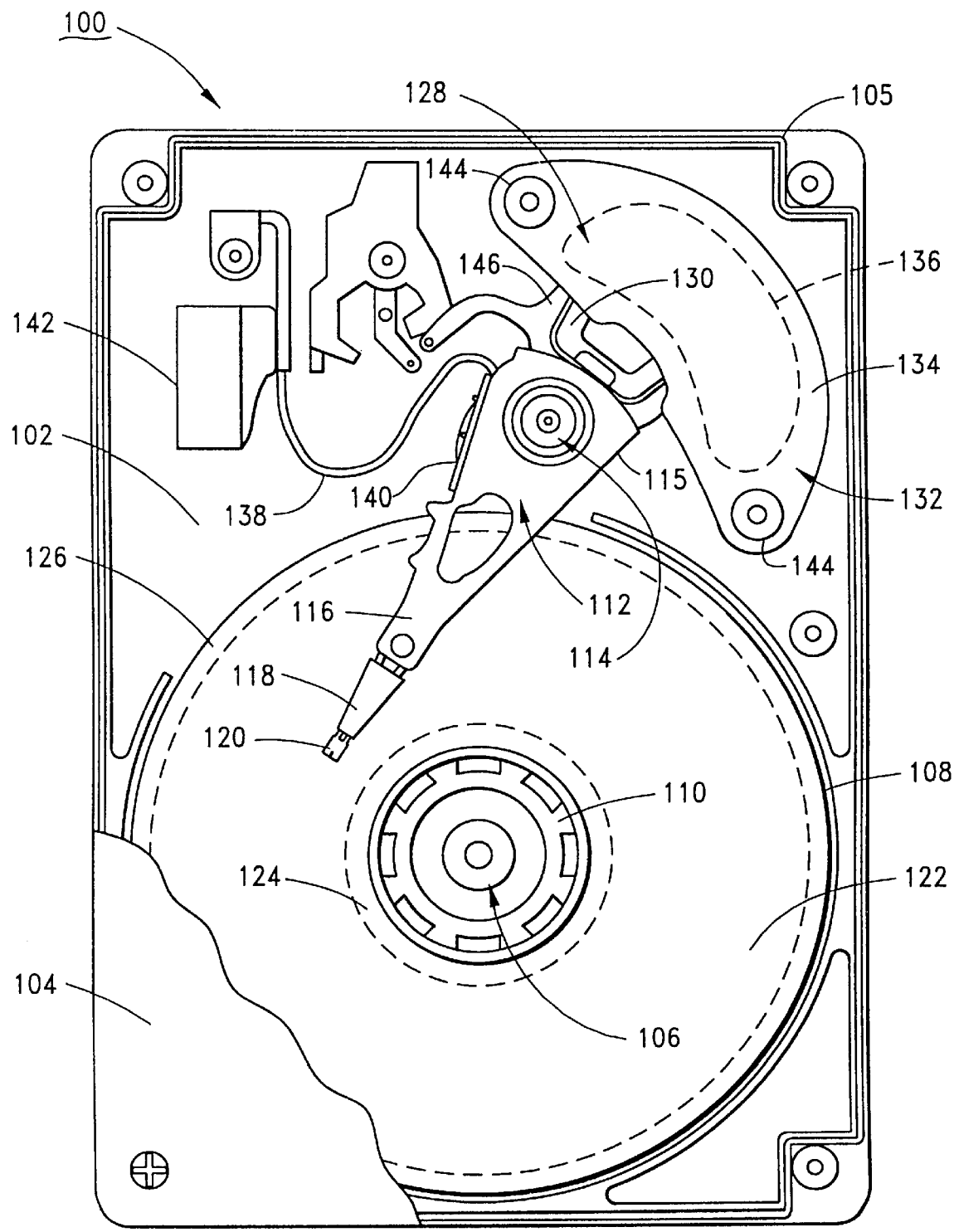
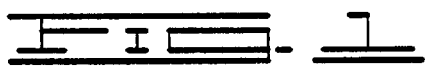
PRIOR ART

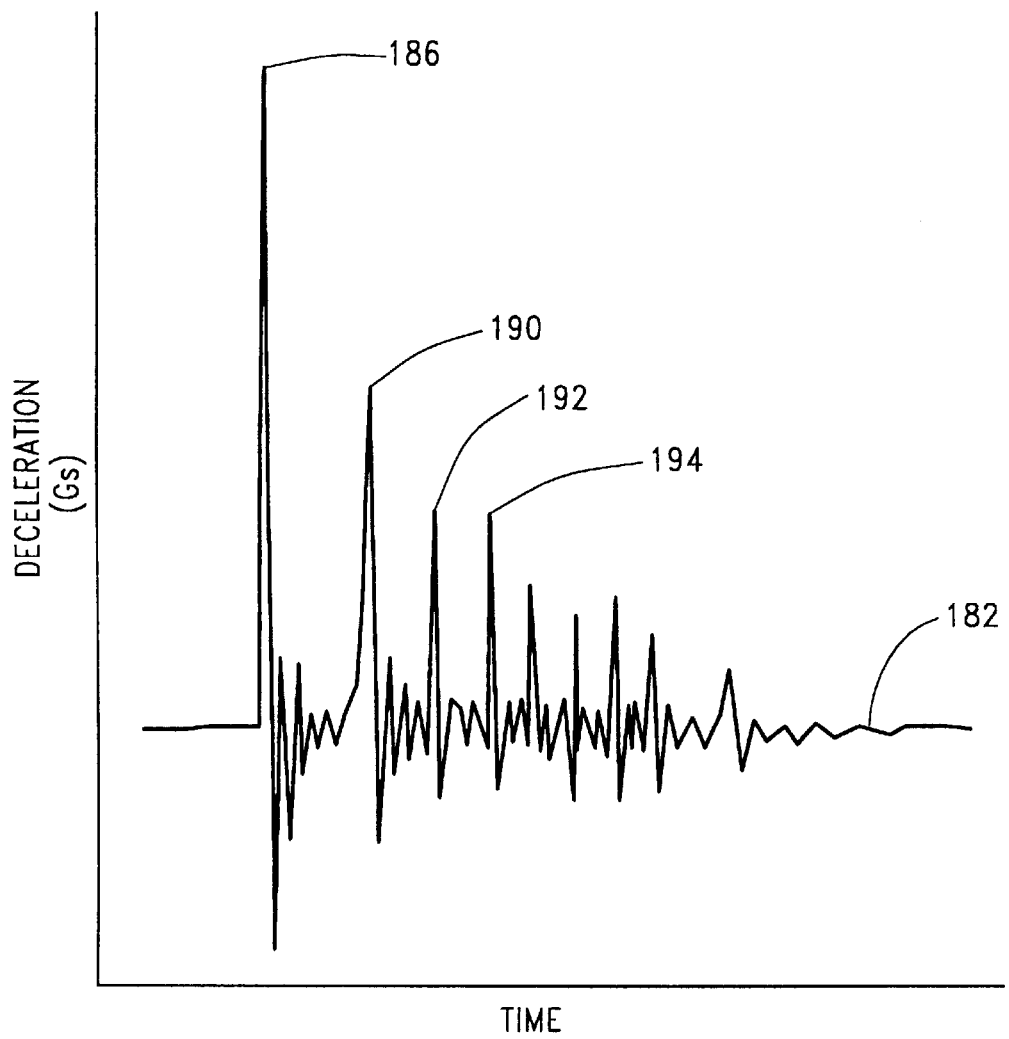
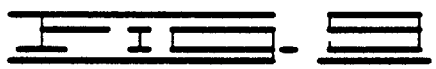
FIG. 9
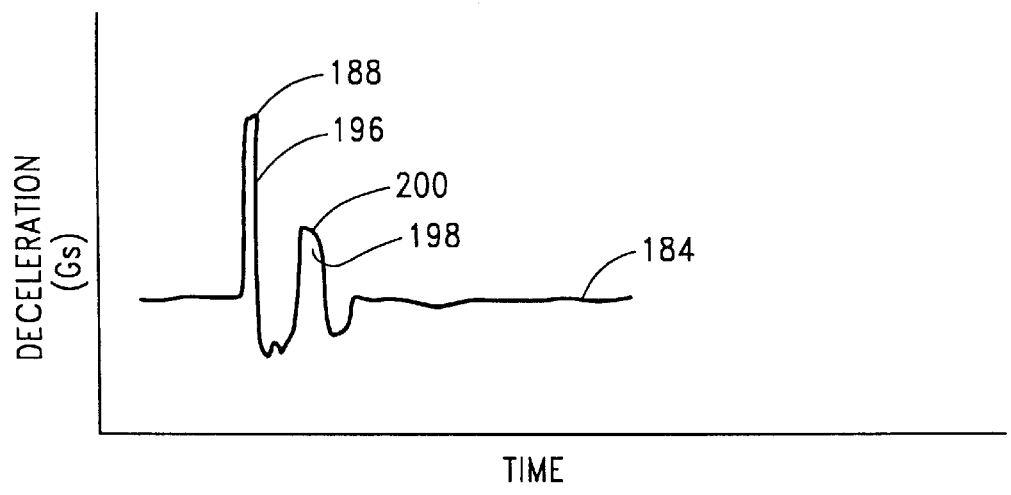
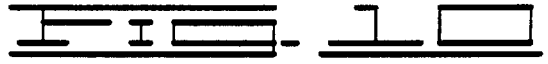
FIG. 10

ACTUATOR CRASH STOPS PROVIDING A TWO-STAGE BRAKING IMPULSE

RELATED APPLICATIONS

This application claims the benefit of United States Provisional Application No. 60/078,919 entitled CAPTURED TWO STAGE CANTILEVERED CRASH STOPS FOR DISC DRIVES, filed Mar. 20, 1998.

FIELD OF THE INVENTION

The present invention relates generally to the field of disc drive data storage devices, and more particularly but not by way of limitation, to crash stops for limiting the movement of an actuator of the disc drive.

BACKGROUND OF THE INVENTION

Modern disc drives are commonly used in a multitude of computer environments, ranging from super computers to notebook computers, to store large amounts of data in a form that is readily available to a user. Typically, a disc drive has one or more magnetic discs that are rotated by a spindle motor at a constant high speed. Each disc has a data storage surface divided into a series of generally concentric data tracks that are radially spaced across a band having an inner diameter and an outer diameter. The data is stored within the data tracks on the disc surfaces in the form of magnetic flux transitions. The flux transitions are induced by an array of read/write heads. Typically, each data track is divided into a number of data sectors where data is stored in fixed size data blocks.

The read/write head includes an interactive element such as a magnetic transducer. The interactive element senses the magnetic transitions on a selected data track to read the data stored on the track. Alternatively, the interactive element transmits an electrical signal that induces magnetic transitions on the selected data track to write data to the track.

Each of the read/write heads is mounted to a rotary actuator arm and is selectively positioned by the actuator arm over a pre-selected data track of the disc to either read data from or write data to the data track. The read/write head includes a slider assembly having an air bearing surface that, in response to air currents caused by rotation of the disc, causes the head to fly adjacent to the disc surface with a desired gap separating the read/write head and the corresponding disc.

Typically, multiple center-open discs and spacer rings are alternately stacked on a spindle motor hub. The hub, defining the core of the stack, serves to align the discs and spacer rings around a common axis. Collectively the discs, spacer rings and spindle motor hub define a disc pack assembly. The surfaces of the stacked discs are accessed by an actuator assembly which includes the read/write heads and the complementary stack of actuator arms. The actuator assembly also includes head wires which conduct electrical signals from the read/write heads to a flex circuit which, in turn, conducts the electrical signals to a flex circuit connector mounted to a disc drive base deck.

When the disc drive is not in use, the read/write heads are brought to rest in a landing zone which is separate from the data storage locations of the discs. The landing zone provides a non-data storage location on each of the disc surfaces where the read/write heads are positioned before the rotational velocity of the spinning discs decreases below a threshold velocity which sustains the air bearing. The landing zone is typically located near the inner diameter of the discs.

A continuing trend in the industry is the simultaneous reduction in size and increase in data storage capacity and processing speed of modern disc drives. As a result, the discs of modern disc drives increasingly have smaller diameters and tighter disc-to-disc spacings. Although providing increasing amounts of storage capacity, narrow vertical spacing of the discs gives rise to a problem of increased sensitivity to operational vibrations and to external mechanical shock. Additionally, as disc drives continue to decrease in size, smaller heads, thinner substrates, longer and thinner actuator arms and thinner gimbal assemblies continue to be incorporated into the disc drives. Faster seek times also demand increased velocity of the actuator assembly. These factors significantly increase the need to protect the disc drives from incidental contact between the actuator arm/gimbal assemblies and the disc surfaces.

The requirement for these non-data storage locations on the disc works counter to the general trend for ever increasing data storage capacity. As a result, it is necessary to limit the size of the non-data zones, and to precisely control the extent of actuator travel relative to the non-data zones. Otherwise, an actuator that travels beyond the desired extent of radial travel likely results in damage to the read/write head. The inner extent of radial travel allows the read/write head to travel inwardly past the inner most data track to the landing zone where the read/write head can be parked on the disc surface when the disc drive is non-operational. Inward travel beyond this inner extent of travel can result in damaging contact of the read/write head with the spindle motor hub. The outer extent of radial travel allows the read/write head to access the outer most data track. Outward travel beyond this outer extent of travel can result in the read/write moving beyond the outer edge of the data disc where there is no sustaining airflow, causing damage to the read/write heads which can contact one another or the spinning discs.

As requirements for faster data processing demand ever increasing actuator speed and associated deceleration rates during seek cycles, the likelihood of overshooting the target track increases. Such an overshoot near the extents of travel can resultingly damage the read/write heads. Also, unfortunately, control circuit errors are known to create "runaway" conditions of the actuator wherein the actuator fails to decelerate at the appointed time. To protect the read/write heads from catastrophic failure, it is well known and practiced in the art to employ positive stops which limit the actuator travel to locations only between the desired extents of travel.

In providing such a positive stop, or crash stop, it is necessary that the crash stop decelerate the actuator quickly and in a short distance, but without damaging the actuator assembly. The maximum deceleration is limited to that which is below the acceleration force limits of the actuator assembly, such as below the deceleration force that would cause the transducer to deflect away from a supporting member and thereby either contact the data storage surface or plastically deform the supporting member. As a result, numerous attempts to provide a controlled braking impulse to the actuator have been made.

Applying a general dampened braking impulse is known in the art, such as by the use of an air cylinder type dampener as taught by U.S. Pat. No. 4,937,692 issued to Okutsu. In this approach fluid is displaced by a piston that is responsive to a stop member that obstructs the movement of the actuator beyond the desired extent of travel. The dampened braking impulse provides a resistive force for decelerating the actuator, but without the typical sudden deceleration of a rigid stop member, such as a rigid stop pin.

Manufacturability and cost constraints have urged the art toward more simple mechanisms. The use of a resilient pad is widely known, such as that of the teaching of U.S. Pat. No. 4,890,176 issued to Casey et al. and assigned to the assignee of the present invention. Spring members, too, are widely used in the art, such as that according to the teaching of U.S. Pat. No. 4,635,151 issued to Hazebrouck.

The primary objection to resilient pads and springs is the relatively long stopping distances necessary to compress the responsive member sufficiently so as to develop an effective braking force. One attempted solution is to provide a preload force to the resilient member, such as is taught by U.S. Pat. No. 4,949,206 issued to Phillips et al. Another approach is to provide cantilever members that elastically deflect in response to the impact force of the actuator, such as is taught by U.S. Pat. No. 5,134,608 issued to Strickler and U.S. Pat. No. 5,600,516 issued to Phillips et al. and assigned to the assignee of the present invention.

Where the resilient member provides a superior initial impact response in not significantly increasing the peak deceleration rate, the relatively large amount of disc space necessarily reserved for stopping distance runs counter to the efforts in maximizing disc space utilization. The optimal solution for minimizing the stopping distance, as currently practiced in the art, is the use of a cantilevered stopping pin. Even so, the peak deceleration rates are difficult to control, and accordingly, there is a need for an improved crash stop apparatus for a disc drive that combines the control stopping distance performance of the cantilevered stop pin with the minimal peak deceleration performance of the resilient member.

SUMMARY OF THE INVENTION

The present invention provides a crash stop assembly for a disc drive assembly, wherein the disc drive assembly has a disc pack with a data storage disc having a landing zone and a data storage zone. The disc pack includes a spindle motor for rotating the disc. An actuator of the disc drive assembly is rotatably supported in a plane parallel to that of the disc and supports an array of read/write heads in radial movement across the disc in data reading and writing relationship to the disc.

The disc drive has a voice coil motor that operably moves the actuator to move the read/write heads radially between the parked location and the data storage location. The parked location provides a landing zone for the read/write heads when the disc drive is non-operational. The voice coil motor includes a magnet assembly having a pair of opposing magnet members supported by a pair of opposing poles. In moving the actuator it is advantageous to constrain movement of the read/write heads to positions within an inner and an outer extent of travel, which includes the data storage locations and the landing zone. In preventing movement of the read/write heads beyond the inner and outer extents, an inner and outer crash stop are provided.

The crash stops are interposed between the poles of the magnet assembly and are disposed in the path of travel of the actuator. When the read/write head is approaching the inner extent of travel the actuator pressingly engages the inner crash stop. Likewise, when the read/write head is approaching the outer extent of travel the actuator pressingly engages the outer crash stop. In both cases the crash stop prevents further radial movement of the actuator that would place the read/write head beyond the desired extent of travel.

Each crash stop has a pin that is fixed by a pole at a proximal end, the distal end cantilevered from the proximal end and orthogonally disposed in the path of the actuator. An elastomeric member is compressingly interposed between the poles and has a longitudinal opening which receivingly engages the distal portion of the pin to support the pin in operable engagement with the actuator.

The crash stops of the present invention provide a two-stage braking impulse to the actuator for reducing the stopping distance without increasing the peak deceleration of the actuator as it comes to rest. The elastomeric member in combination with the cantilevered pin proves a superior dampened response as the elastomeric member dampens the shock at initial impact as well as dampening the resonance of the cantilevered pin.

These and other advantages and features of the present invention will be apparent from the following description when read in conjunction with the drawings and appended claims.

BRIEF DESCRIPTION OF THE DRAWINGS

FIG. 1 is a plan view of a prior art disc drive, in which the present invention is particularly well suited.

FIG. 9 is a graphical representation of deceleration response of an actuator assembly in response to impact with a pin.

FIG. 10 is a graphical representation of deceleration response of an actuator assembly in response to impact with an elastomeric member.

DETAILED DESCRIPTION

Figure 2:
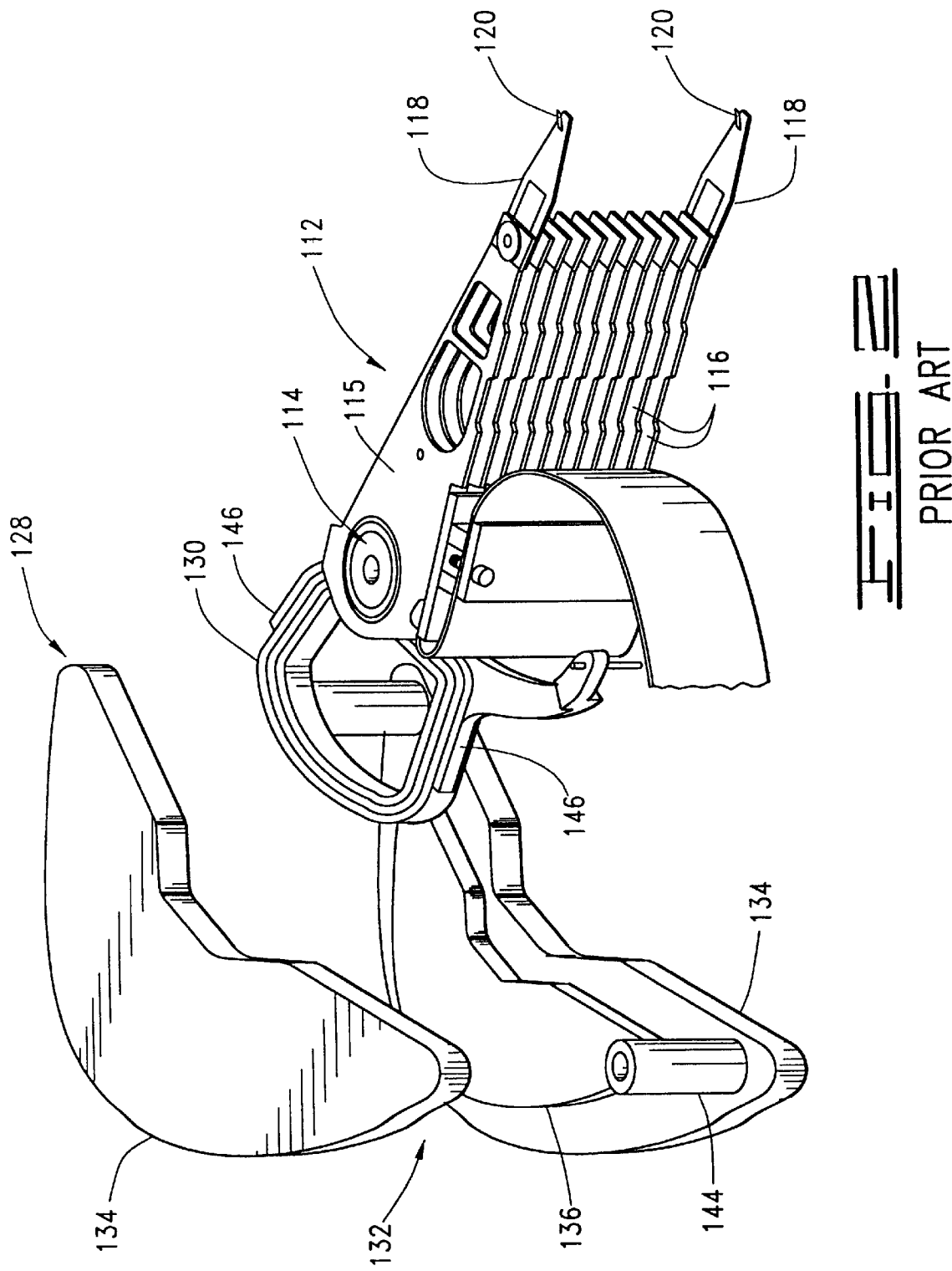
FIG. 2 is a partially exploded view of the voice coil motor and actuator assembly of the prior art disc drive of FIG. 1.

Referring to the drawings in general, and more particularly to FIG. 1, shown therein is a plan view of a disc drive 100 constructed in accordance with the prior art. The disc drive 100 includes a base deck 102 to which various disc drive components are mounted, and a cover 104 which together with the base deck 102 and a perimeter gasket 105 provide a sealed internal environment for the disc drive 100. The cover 104 is shown in a partial cut-away fashion to expose selected components of interest. It will be understood that numerous details of construction of the disc drive 100 are not included in the following description because they are well known to those skilled in the art and are believed to be unnecessary for the purpose of describing the present invention.

Mounted to the base deck 102 is a spindle motor 106 to which a plurality of discs 108 are mounted and secured by a clamp ring 110 for rotation at a constant high speed. Adjacent the discs 108 is an actuator assembly 112 which rotates about a pivot bearing assembly 114 in a plane parallel to the discs 108. The actuator assembly 112 includes an E-block 115 that is supported by the pivot bearing assembly 114. The E-block 115 has actuator arms 116 (only one shown) that support load arm assemblies 118. The load arm assemblies 118, in turn, support read/write heads 120, with each of the read/write heads 120 adjacent a surface of one of the discs 108 and maintained in a data reading and writing spatial relationship by a conventional slider assembly (not shown) which supports the read/write head 120 in response to air currents generated by the spinning discs 108 during operation of the disc drive 100.

Each of the discs 108 has a data storage location with a data recording surface 122 divided into concentric circular data tracks (not shown), and the read/write heads 120 are positionably located adjacent data tracks to read data from or write data to the tracks. The data recording surface 122 is bounded at an inner extent by a circular landing zone 124 where the read/write heads 120 can come to rest against the discs 108 at times when the disc drive 100 is inoperable. The data recording surface is similarly bounded at an outer extent by a circular snubber zone 126 where a conventional snubber (not shown) can contact the disc 108 to limit an axial runout. It is advantageous to limit the pivotal motion of the E-block 115 so as to constrain the radial position of the read/write heads 120 to locations within the data recording surface 122. Otherwise the read/write heads 120 can easily be damaged if they inadvertently travel off the edge of the disc 108 or into the spindle motor 106. For this reason it is well known in the art to provide positive stops, or crash stops, to limit the pivoting motion of the E-block 115. The crash stops of the present invention provide an improved braking impulse which reduces the stopping distance of a moving E-block without increasing a peak deceleration of the E-block, as is described below.

The E-block 115 is positioned by a voice coil motor (VCM) 128, the VCM 128 having an actuator coil 130 supported by the E-block 115 and immersed in a magnetic field generated by a magnet assembly 132. A magnetically permeable flux path, such as provided by a pair of steel plates 134 (sometimes referred to as a pole 134), completes the magnetic circuit of the VCM 128. In a preferred embodiment shown in FIG. 1, one pole 134 is attached to the base deck 102 and the other pole 134 is attached to the cover 104. A pair of magnets 136 are supported about the actuator coil 130, each magnet 136 supported by one of the poles 134.

When controlled current is passed through the actuator coil 130, an electromagnetic field is set up which interacts with the magnetic circuit of the magnet assembly 132 to cause the actuator coil 130 to move relative to the magnets 136 in accordance with the well-known Lorentz relationship. As the actuator coil 130 moves, the E-block 115 pivots about the pivot bearing assembly 114 causing the actuator arms 116 to move the read/write heads 120 adjacent to, and radially across, the discs 108.

To provide the requisite electrical conduction paths between the read/write heads 120 and disc drive read/write circuitry (not shown), head wires (not separately shown) are routed on the actuator assembly 112 from the read/write heads 120, along the load arm assemblies 118 and the actuator arms 116, to a flex circuit 138. The head wires are secured by way of a suitable soldering process to corresponding pads of a printed circuit board (PCB) 140. In turn, the flex circuit 138 is connected to a flex circuit bracket 142 in a conventional manner which, in turn, is connected through the base deck 102 to a disc drive PCB (not shown) mounted to the underside of the base deck 102. The disc drive PCB provides the disc drive read/write circuitry which controls the operation of the read/write heads 120, as well as other interface and control circuitry for the disc drive 100.

FIG. 2 shows a partially exploded view of the actuator assembly 112 and the VCM 128, the VCM 128 having the actuator coil 130 pivotally moving within the magnet assembly 132. The poles 134 are spatially separated in a parallel relationship by a pair of pole spacers 144 (only one shown). The actuator coil 130 is receivingly disposed within a supporting arm 146 which, in a preferred embodiment illustrated in FIGS. 1 and 2, is integrally formed as a portion of the E-block 115. Alternatively, the supporting arm 146 can be a non-integral member attached to the E-block 115.

Figure 3:
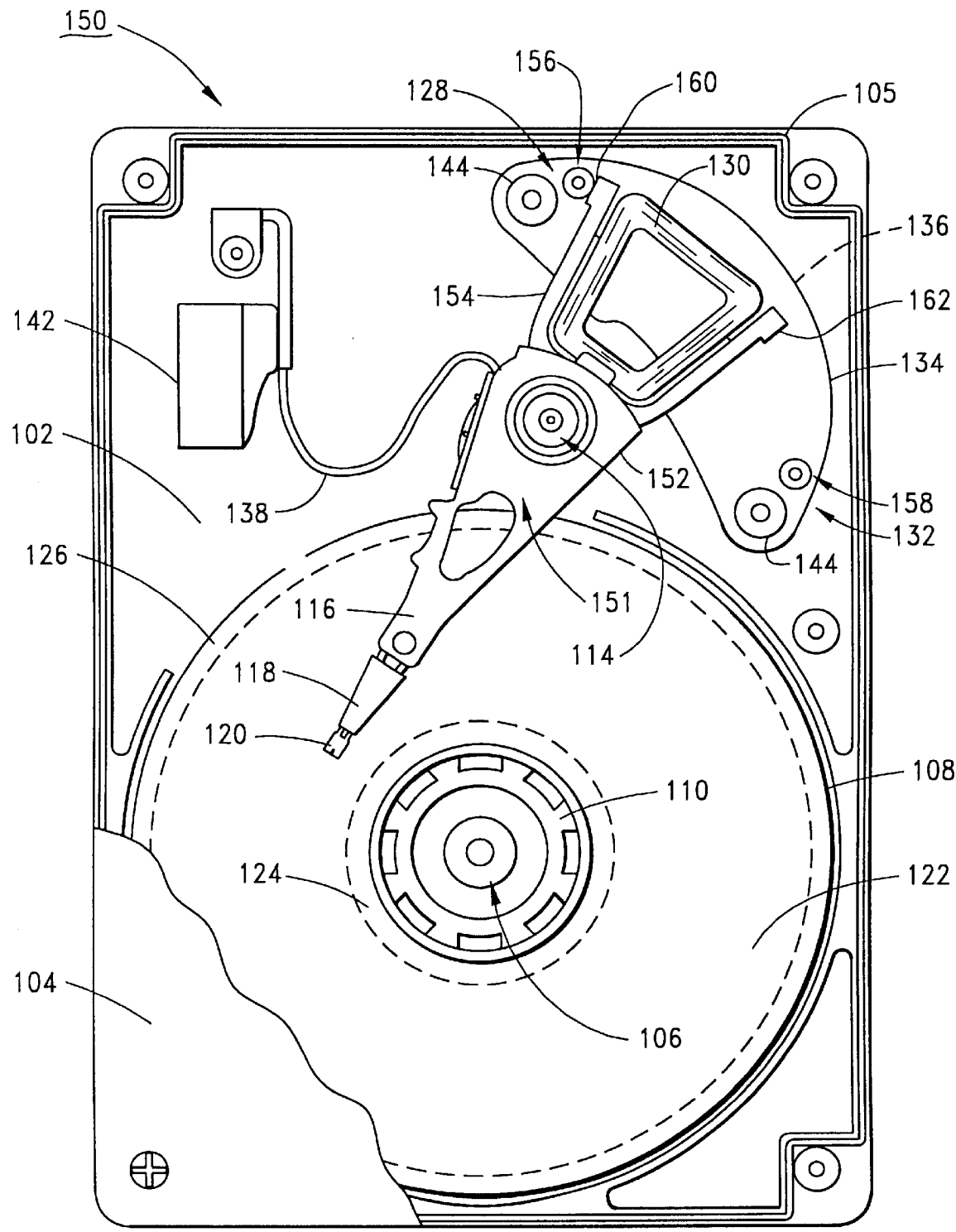
FIG. 3 is a plan view of a disc drive built in accordance with a preferred embodiment of the present invention, showing the actuator assembly pivoted to position the read/write head to an inner extent of radial travel.
Figure 4:
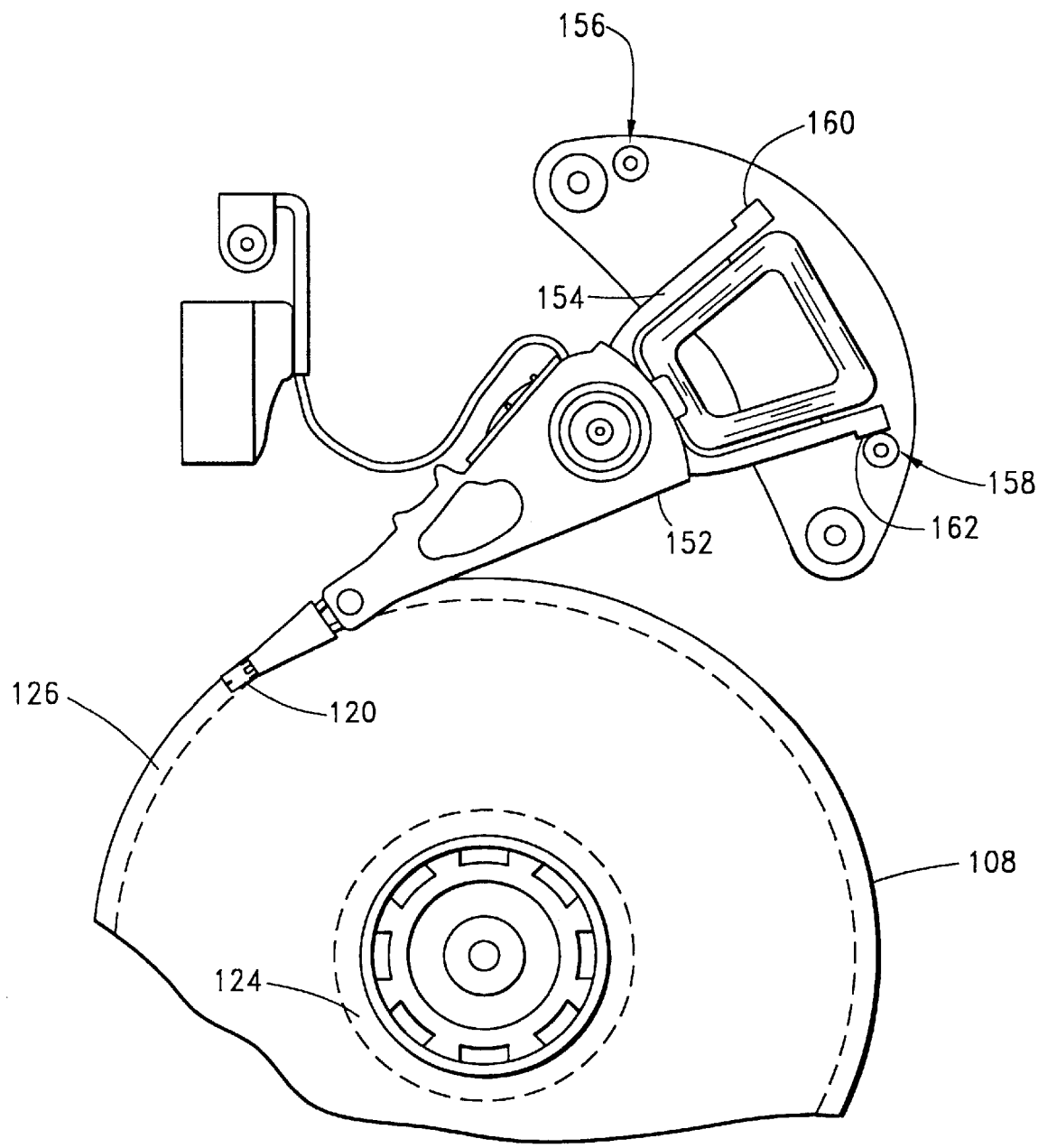
FIG. 4 is a plan view of a portion of the disc drive of FIG. 3, showing the actuator assembly pivoted to position the read/write head to an outer extent of radial travel.

Turning now to FIG. 3 which illustrates a disc drive 150 constructed in accordance with the present invention, wherein components of like construction retain like designation as that in the previous discussion of the prior art disc drive 100 of FIG. 1. It will be noted that an actuator assembly 151 has an E-block 152 that supports an arm 154 that supports the actuator coil 130. Unlike the prior art disc drive 100, however, the pivotal motion of the E-block 152 is limited by a crash stop 156 and a crash stop 158. In FIG. 3 a contacting surface 160 of the arm 154 pressingly engages the crash stop 156 at an E-block 152 pivotal position corresponding to the read/write head 120 being positioned within the landing zone 124 of the disc 108. In FIG. 4 a contacting surface 162 of the arm 154 pressingly engages the crash stop 158 at an E-block 152 pivotal position corresponding to the read/write head 120 being positioned at an outer extent of radial travel, associated with the outermost data track on the disc 108. In this manner the landing zone 124 and the outermost data track define the inner and outer extent of travel for the read/write head 120, the crash stops 156, 158 preventing radial movement beyond these extents.

Figure 5:
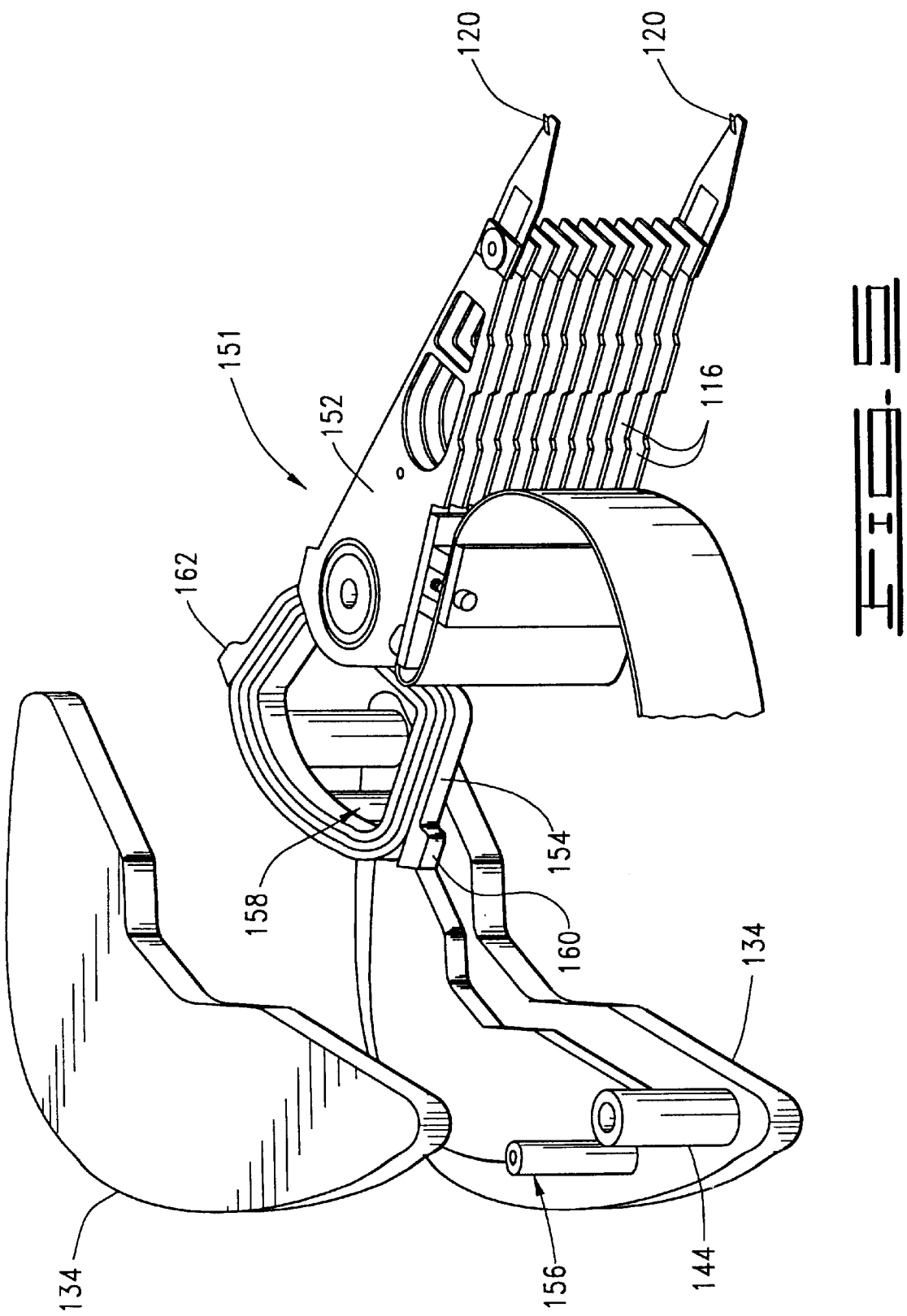
FIG. 5 is a partially exploded view of the voice coil motor and actuator assembly of the disc drive of FIG. 3.
Figure 6:
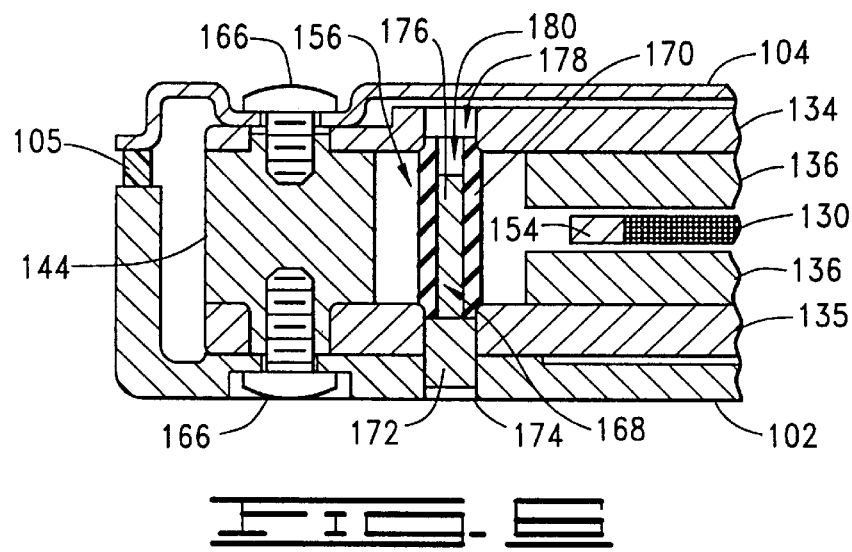
FIG. 6 is a partial elevational view of the disc drive of FIG. 3, showing a two-stage cantilevered crash stop constructed in accordance with a preferred embodiment of the present invention.

FIG. 5 is a partially exploded perspective view of the actuator assembly 151 of FIG. 3, showing the crash stops 156, 158 interposed between the poles 134 of the magnet assembly 132. FIG. 6 is a partial sectional view showing the manner in which the crash stops 156, 158 are supported by the magnet assembly 132 in a preferred embodiment of the present invention.

From viewing FIG. 6 it will be noted that a pair of fasteners 166 threadingly engage the pole spacer 144, one fastener 166 passing through the cover 104 and the top pole 134, the other fastener 166 passing through the base deck 102 and the bottom pole 134. Although not shown in FIG. 6, the other pole spacer 144 can be secured in like manner, thereby securing the magnet assembly 132 between the base deck 102 and the cover 104. The gasket 105 is compressed a selected amount by the threaded engagement of the fasteners 166 to provide a sealed enclosure within the base deck 102 and the cover 104.

The poles 134 support the magnets 136 about the actuator coil 130 which moves orthogonally to the crash stops 156, 158 (only the crash stop 156 is shown in FIG. 6). The crash stop 156 has a cantilevered pin 168 and an elastomeric member 170. In a preferred embodiment shown in FIG. 6 the pin 168 has an enlarged proximal end 172 that forms a characteristic closely fitting relationship with an opening 174 formed by the base deck 102 and the bottom pole 135. The pin 168 furthermore has a reduced diameter, upstanding distal end 176 (also referred to herein as "distal portion") cantilevered from the proximal end 172 and in the path of travel of the arm 154 as the E-block 152 pivots.

The pin 168 can be provided from any material having a modulus of elasticity greater than that of the elastomeric member 170, allowing the advantageous use of a broad range of material properties including those of steel, aluminum and plastic. The elastomeric member 170 can be provided from a fluoroelastomer material, such as the material Fluorel manufactured by 3M.

The elastomeric member 170 in a preferred embodiment shown in FIG. 6 forms a sleeve having an outer diameter larger than the opening 174 and larger than an opposing opening 178 formed by the top pole 134. The elastomeric member 170 is radially compressed at both ends and inserted into the openings 174, 178, thereby retaining the elastomeric member 170 in the path of travel of the arm 154. The elastomeric member 170 furthermore has longitudinal opening 180 that is cross-sectionally smaller than the distal end 176 of the pin 168. The pin 168 is thereby pressingly engaged at the distal end 176 against the elastomeric member 170 along the longitudinal opening 180.

Figures 7, 8:
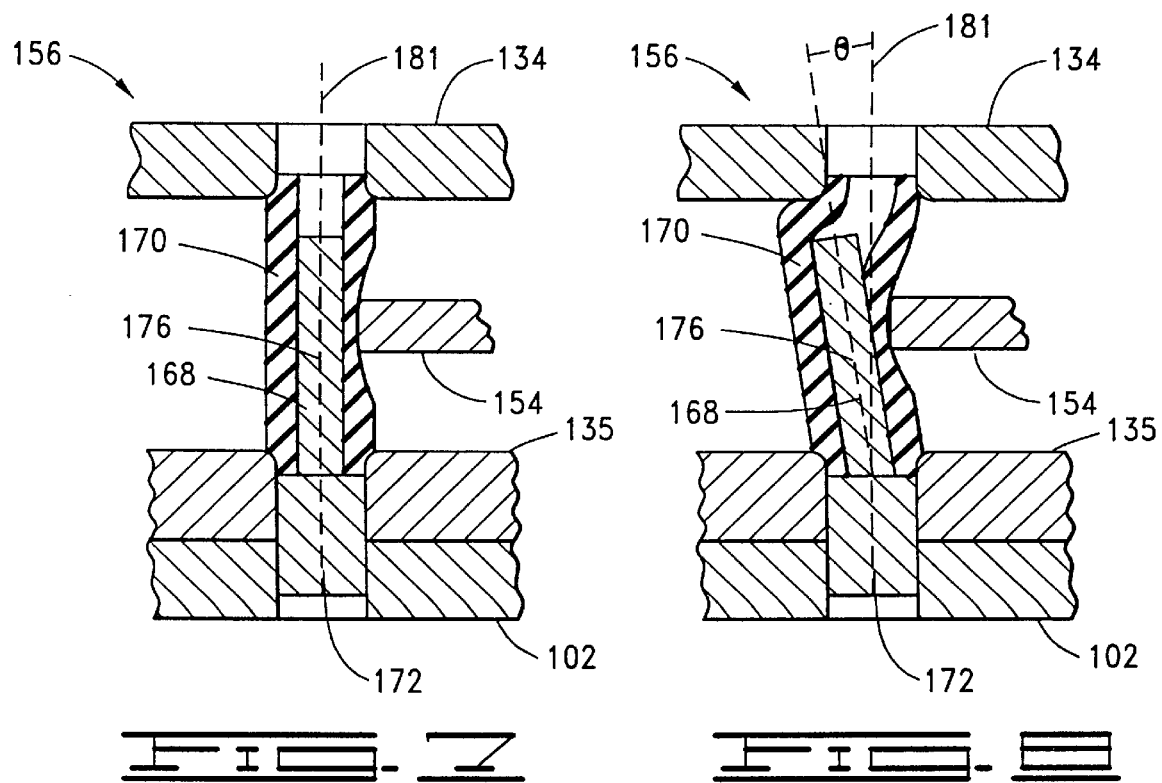
FIG. 7 is a sectional view of one of the two-stage cantilevered crash stops of FIG. 5, at a time imparting a first stage braking impulse to movement of the actuator.
FIG. 8 is a sectional view of one of the two-stage cantilevered crash stops of FIG. 5, at a time imparting a second stage braking impulse to movement of the actuator as the actuator approaches a desired extent of travel.

FIGS. 7 and 8 illustrate the braking impulse of the crash stop 156 to an impact with the arm 154 which occurs when the E-block 152 pivots to a position approaching the desired inner or outer extent of read/write head 120 travel. The response is a two-stage braking impulse, the first stage illustrated by FIG. 7 and the second stage illustrated by FIG. 8.

In the first stage of the braking impulse the impact of the arm 154 compresses the elastomeric member 170 between the arm 154 and the distal portion 176 of the pin 168. In this first stage, where there is negligible deflection of the distal portion 176, the braking impulse is analogous to that of an elastomeric damping member, the response of which is a function of the thickness of the impacted section and the material specific modulus of compressibility. Thus, the pin 168 remains rigidly aligned along a nominal pin axis 181 and the E-block 152 loses energy as the arm compresses the elastomeric member 170 against the pin 168 and is thereby decelerated. If the velocity of the E-block 152 at the time of impact is below a threshold velocity it is possible that the first stage response decelerates the E-block 152 to a resting state. Otherwise, the second stage response is encountered.

In the second stage of the braking impulse the impact of the arm 154 deflects the distal portion 176 of the pin 168 away from the nominal pin axis 181, as indicated by deflection angle θ and. The second stage braking impulse is analogous to that of a deflection of a cantilevered beam, the response of which is a function of the material specific modulus of elasticity and the crosssectionally defined moment of inertia. It will be understood by one skilled in the art that the second stage response is a modified cantilevered beam response because the distal portion 176 is supported in opposition to the force of the impacting arm 154 by the elastomeric member 170 which is in tension between the arm 154 and the top pole 134 during the second stage response. In this manner the elastomeric member 170 dampens the resonance of the distal portion 176.

The combination of the elastomeric member 170 and the pin 168 providing the two-stage braking impulse combines the advantageous features of both. An elastomeric member alone would tend to decelerate the E-block 152 relatively slowly and smoothly, there being no dramatic peak in deceleration as the E-block 152 comes to rest. A cantilevered pin alone would tend to decelerate the E-block 152 relatively quickly and abruptly, but with a peak deceleration in the response. The combination of the present invention provides a braking impulse with a relatively short stopping distance but a relatively low peak deceleration of the E-block 152.

FIGS. 9 and 10 provide a comparison of the response of an actuator assembly 112 impacting a pin (see 182) versus that of an elastomeric member (see 184). It will be noted the peak deceleration 186 of the pin response 182 is significantly higher than the peak deceleration 188 of the elastomeric member response 184. The pin response 182 subsequently shows number of successive rebound shocks, such as 190, 192, 194. etc. These ever-decreasing rebound shocks illustrate a "ringing" response as the actuator assembly 112 is decelerated by a number of relatively steep and sharp spikes of energy dissipation.

The elastomeric member response 184 is relatively more dampened, whereas the area under the curves 196, 198 represent the kinetic energy dissipated during deceleration. Although dampened, the response 184 nevertheless has one or more rebound shocks 200 which can exceed the maximum deceleration with which the actuator assembly 112 can be stopped without damage.

Figure 11:
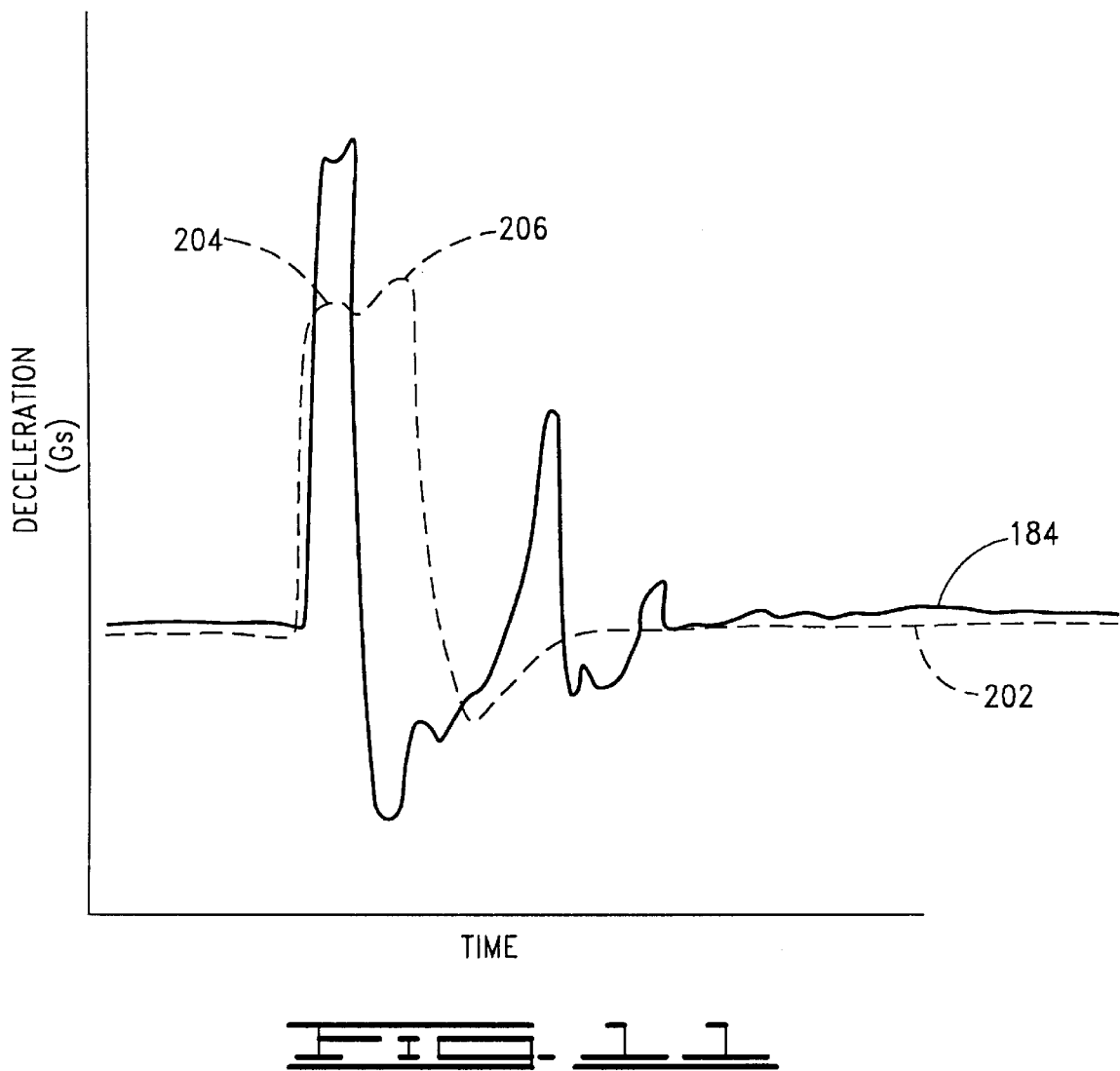
FIG. 11 provides a graphical comparison of the deceleration response of FIG. 10 with the deceleration response achieved using a two-stage crash stop assembly constructed in accordance with preferred embodiments of the present invention.

FIG. 11 shows a comparison of the elastomeric response of FIG. 10 with that of the response 202 of the actuator assembly 112 constructed in accordance with the present invention. From the comparison it will be noted the present invention has an response 202 that provides a superior dampening result with no rebound shocks. The maximum deceleration is relatively less, with the two stages shown wherein the compression stage of the impact is shown at point 204 and the deflection of the pin stage is shown at point 206.

The engagement of the elastomeric member 170 dampens not only the initial impact of the actuator assembly 112, but also dampens the resonance of the otherwise "ringing" response as illustrated in FIG. 9 (see 182) and discussed above. This prevents the creation of rebound shocks and provides a braking impulse with an overall reduced maximum deceleration with quicker, more responsive dampening of the actuator.

The present invention provides crash stops (such as 156, 158) that provide a two-stage braking response to an actuator assembly (such as 151) that is approaching a desire inner or outer extent of radial travel. The crash stops are disposed in the path of a supporting arm (such as 154) that supports an actuator coil (such as 130). The actuator coil is part of a voice coil motor (such as 128) which operably positions the actuator assembly to radially move a read/write head (such as 120) in data reading and writing relationship to a disc (such as 108). The data disc has a data recording surface (such as 122) which is bounded by an inner and outer extent of travel of the read/write head.

When the actuator assembly has positioned the read/write head at the inner extent of radial travel, then the arm engages the inner crash stop to prevent further movement of the actuator assembly that would otherwise position the read/write head closer to the rotational center of the disc. Similarly, when the actuator assembly has positioned the read/write head at the outer extent of radial travel, then the arm engages the outer crash stop to prevent further movement of the actuator assembly that would otherwise position the read/write head closer to the outer edge of the disc.

The inner and outer crash stops are interposed within poles (such as 134, 135) of a magnet assembly (such as 132) and in the path of travel of the arms of the actuator assembly. The poles are supported by a base deck (such as 102) and a cover (such as 104), and in turn support a pair of magnets (such as 136) about the actuator coil. The crash stops each have a pin (such as 168) that has a proximal portion (such as 172) supported by the base deck and adjacent pole, and a distal portion (such as 176) extending cantilevered from the proximal portion. An elastomeric member (such as 170) is compressingly interposed between the poles, and has a longitudinal opening (such as 180) that receivingly engages the distal portion.

The crash stops of the present invention provide a two-stage braking impulse to an actuator assembly that approaches the desired extent of travel. In the first stage the elastomeric member is compressed to decelerate the actuator assembly. If the momentum of the E-block is greater than a threshold braking capability of the elastomeric member, the impacting E-block will deflect the distal portion of the pin. Together, the compression of the elastomeric member and the deflection of the pin provide a braking impulse with a relatively short stopping distance and a relatively low peak deceleration of the actuator assembly, in comparison to a crash stop constructed of only an elastomeric member or only a cantilevered pin.

It is to be understood that even though numerous characteristics and advantages of various embodiments of the present invention have been set forth in the foregoing description, together with details of the structure and function of various embodiments of the invention, this disclosure is illustrative only and changes may be made in details especially in matters of structure and arrangement of parts within the principles of the present invention to the full extent indicated by the broad general meaning of the terms in which the appended claims are expressed.

What is claimed is:

1. A crash stop assembly for limiting the travel of an actuator in a disc drive, the actuator pivotally supported by an enclosure for movement of a read/write head in data reading and writing relationship to a data disc, the crash stop assembly comprising:

a deflectable pin having a proximal end supported by the enclosure and having a distal end cantilevered from said proximal end, the pin nominally aligned along a pin axis in an undeflected state; and an elastomeric member adjacent said pin, wherein the pin and elastomeric member are configured to cooperatively decelerate the actuator through a two-stage braking operation wherein, during the first stage, the actuator compresses the elastomeric member against the pin while the pin nominally remains in the undeflected state so that kinetic energy of the actuator is dissipated in relation to a modulus of compressibility of the elastomeric member and wherein, during the second stage, the actuator deflects the pin away from the nominal pin axis so that kinetic energy of the actuator is further dissipated in relation to a modulus of elasticity of the pin, and wherein the pin returns to the undeflected state when the actuator reaches the rest position.

2. The crash stop assembly of claim 1 wherein the enclosure has a base deck and a cover and wherein the disc drive has a voice coil motor operably positioning the actuator the voice coil motor having a first and second magnet, the first magnet supported by a first pole attached to the base deck., the second magnet attached to the first magnet and maintained in separated and parallel relationship by a pole spacer therebetween, and wherein said pin proximal end forms a characteristic closely fitting relationship with an opening in the base deck and is slidably disposed therein.

3. The crash stop assembly of claim 2 wherein said elastomeric member forms a sleeve having a longitudinal opening that receivingly engages the cantilevered distal end of said pin.

4. The crash stop assembly of claim 3 wherein said elastomeric member has a proximal end supported by the cover, said clastomeric member thereby cooperating with the base deck opening to operably retain said pin between the poles in stopping engagement with the actuator.

5. The crash stop assembly of claim 1 wherein the actuator pressingly engages the stop at a location where the read/write head has substantially moved to an outer extent of desired travel.

6. The crash stop assembly of claim 1 wherein the actuator pressingly engages the crash stop assembly at a location where the read/write head has substantially moved to an inner extent of desired travel.

7. In a disc drive assembly having an enclosure supporting a rotating data disc and supporting an actuator in pivotal read/write data relationship to the data disc, the actuator moveable by a voice coil motor to position a read/write head supported by the actuator to selected positions between a desired inner extent of travel and a desired outer extent of travel corresponding to a band of data storage locations on the data disc, the extent of travel of the actuator determined by a crash stop assembly comprising:

a deflectable pin having a proximal end supported by the enclosure and having a distal end cantilevered from said proximal end, the pin nominally aligned along a pin axis in an undeflected state; and an elastomeric member covering said pin, wherein the pin and elastomeric member are configured to cooperatively decelerate the actuator through a two-stage braking operation wherein, during the first stage, the actuator compresses the elastomeric member against the pin while the pin nominally remains in the undeflected state so that kinetic energy of the actuator is dissipated in relation to a modulus of compressibility of the elastomeric member and wherein, during the second stage, the actuator deflects the pin away from the nominal pin axis so that kinetic energy of the actuator is further dissipated in relation to a modulus of elasticity of the pin, and wherein the pin returns to the undeflected state when the actuator reaches the rest position.

8. The crash stop assembly of claim 7 wherein the enclosure has a base deck and an opposing cover, and wherein the disc drive has a voice coil motor operably positioning the actuator, the voice coil motor having a first and second magnet, the first magnet supported by a first pole attached to the base deck, the second magnet attached to the first magnet and maintained in separated and parallel relationship by a pole spacer therebetween, and wherein said pin proximal end forms a characteristic closely fitting relationship with an opening in the base deck and is slidably disposed therein.

9. The crash stop assembly of claim 8 wherein said elastomeric member forms a sleeve having a longitudinal opening that receivingly engages the cantilevered distal end of said pin.

10. The crash stop assembly of claim 9 wherein said elastomeric member has a proximal end supported by the cover, said elastomeric member thereby cooperating with the base deck opening to operably retain said pin between the poles in stopping engagement with the actuator.

11. The crash stop assembly of claim 7 wherein the actuator pressingly engages the stop at a location where the read/write head has substantially moved to an outer extent of desired travel.

12. The crash stop assembly of claim 7 wherein the actuator pressingly engages the stop at a location where the read/write head has substantially moved to an inner extent of desired travel.

13. A disc drive, comprising:

a base;

a data disc supported by said base;

an actuator pivotally supported by said base and supporting a read/write head in data reading and writing relationship to the disc within a data storage location having an inner extent and an outer radial extent on the data disc; and means for limiting a travel of the actuator between the inner extent and outer extent.

* * * * *